US011436050B2

(12) United States Patent
Peng et al.

(10) Patent No.: US 11,436,050 B2
(45) Date of Patent: Sep. 6, 2022

(54) METHOD, APPARATUS AND COMPUTER PROGRAM PRODUCT FOR RESOURCE SCHEDULING

(71) Applicant: EMC IP Holding Company LLC, Hopkinton, MA (US)

(72) Inventors: Layne Lin Peng, Shanghai (CN); Kun Wang, Beijing (CN); Sanping Li, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 691 days.

(21) Appl. No.: 16/380,654

(22) Filed: Apr. 10, 2019

(65) Prior Publication Data

US 2019/0324805 A1   Oct. 24, 2019

(30) Foreign Application Priority Data

Apr. 20, 2018  (CN) .......................... 201810360349.4

(51) Int. Cl.
*G06F 9/48*  (2006.01)
*G06N 20/00*  (2019.01)
*G06N 3/08*  (2006.01)
*G06F 9/50*  (2006.01)

(52) U.S. Cl.
CPC .......... *G06F 9/4887* (2013.01); *G06F 9/5005* (2013.01); *G06N 3/08* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 10,685,295 B1 * | 6/2020 | Ross | G06F 9/5016 |
| 10,713,589 B1 * | 7/2020 | Zarandioon | G06N 20/00 |
| 11,004,010 B2 * | 5/2021 | Hillard | G06Q 40/04 |
| 2018/0018587 A1 * | 1/2018 | Kobayashi | G06N 20/00 |
| 2018/0082212 A1 * | 3/2018 | Faivishevsky | G06N 20/00 |
| 2018/0314933 A1 * | 11/2018 | Bleiweiss | G06N 5/003 |
| 2018/0314971 A1 * | 11/2018 | Chen | G06N 20/20 |

* cited by examiner

*Primary Examiner* — Isaac Tuku Tecklu
(74) *Attorney, Agent, or Firm* — Ryan, Mason & Lewis, LLP

(57) ABSTRACT

Embodiments of the present disclosure provide a method, apparatus and computer program product for resource scheduling. The method comprises obtaining a processing requirement for a deep learning task, the processing requirement being specified by a user and at least including a requirement related to a completion time of the deep learning task. The method further comprises determining, based on the processing requirement, a resource required by the deep learning task such that processing of the deep learning task based on the resource satisfies the processing requirement. Through the embodiments of the present disclosure, the resources can be scheduled reasonably and flexibly to satisfy the user's processing requirement for a particular deep learning task without requiring the user to manually specify the requirement on the resources.

20 Claims, 4 Drawing Sheets

METHOD, APPARATUS AND COMPUTER PROGRAM PRODUCT FOR RESOURCE SCHEDULING

RELATED APPLICATION(S)

The present application claims priority to Chinese Patent Application No. 201810360349.4, filed Apr. 20, 2018, and entitled "Method, Apparatus and Computer Program Product for Resource Scheduling," which is incorporated by reference herein in its entirety.

FIELD

The present disclosure generally relates to the field of computer processing. More specifically, the present disclosure relates to a method, apparatus and computer program product for resource scheduling.

BACKGROUND

In recent years, emerging technologies, such as high-performance computing, machine learning, deep learning, artificial intelligence, and the like, have rapidly developed. With these emerging technologies, technicians can design different processing tasks to achieve respective processing objects according to actual needs. Such tasks can be referred to as deep learning tasks. A deep learning task often relies on a large amount of data and a high-intensity processing capability, particularly a parallel processing capability. As a result, in addition to general processing resources such as Central Processing Units (CPUs) and storage resources such as storage devices, the deep learning task also requires dedicated processing resources such as Graphics Processing Units (GPUs) and Field Programmable Gate Arrays (FPGAs). Dependent on requirements in different aspects of the tasks including objects, complexity, and accuracy, the resources required by different deep learning tasks may vary. It is desirable to schedule resources for these deep learning tasks in a reasonable manner.

SUMMARY

Embodiments of the present disclosure provide a solution for resource scheduling.

In a first aspect of the present disclosure, there is provided a method for resource scheduling. The method comprises obtaining a processing requirement for a deep learning task, the processing requirement being specified by a user and at least including a requirement related to a completion time of the deep learning task. The method further comprises determining, based on the processing requirement, a resource required by the deep learning task such that processing of the deep learning task based on the resource satisfies the processing requirement.

In a second aspect of the present disclosure, there is provided an apparatus for resource scheduling. The apparatus comprises a processor and a memory coupled to the processor and having instructions stored thereon which, when executed by the processor, cause the apparatus to perform steps. The steps comprise obtaining a processing requirement for a deep learning task, the processing requirement being specified by a user and at least including a requirement related to a completion time of the deep learning task. The steps also comprise determining, based on the processing requirement, a resource required by the deep learning task such that processing of the deep learning task based on the resource satisfies the processing requirement.

In a third aspect of the present disclosure, there is provided a computer program product being tangibly stored on a computer-readable medium and comprising machine-executable instructions which, when executed, cause a machine to perform the method according to the first aspect.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The objectives, advantages and other features of the present disclosure will become more apparent through the detailed description of example embodiments of the present disclosure with reference to the accompanying drawings, where the same reference symbols generally refer to the like elements in the example embodiments of the present disclosure.

DETAILED DESCRIPTION

Figure 1:
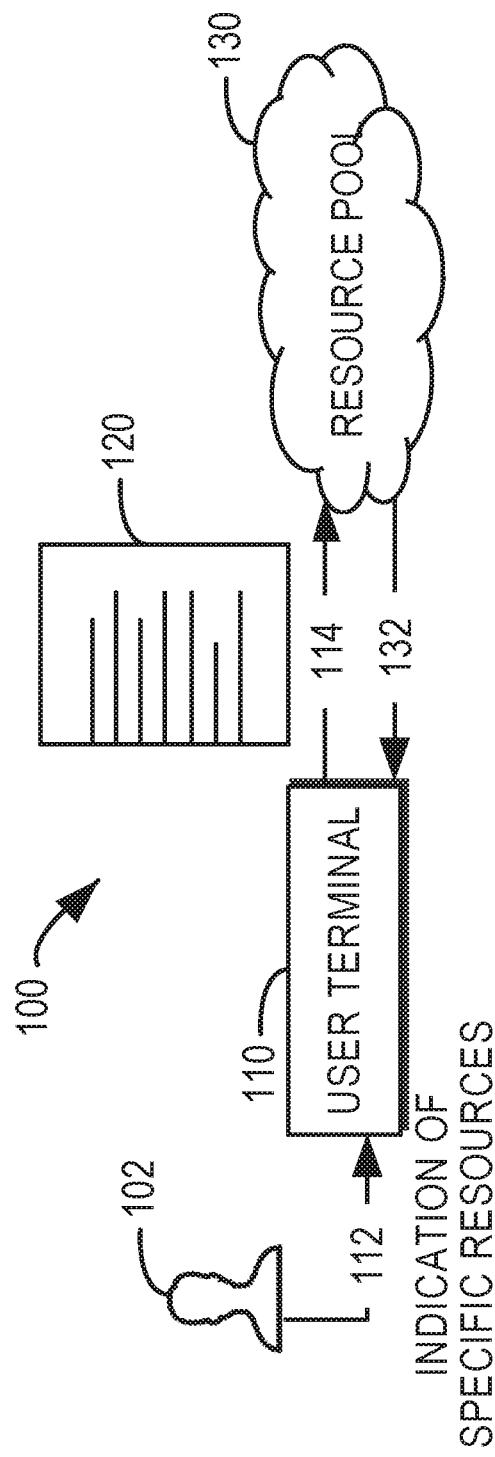
FIG. 1 illustrates a schematic diagram of a conventional system for resource scheduling.

Principles of the present disclosure will now be described with reference to several example embodiments illustrated in the drawings. Although some preferred embodiments of the present disclosure are shown in the drawings, it is to be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an example embodiment" are to be read as "at least one example embodiment." The term "another embodiment" is to be read as at least one further embodiment." The term "first," "second" or the like can represent different or the same objects. Other definitions, either explicit or implicit, may be included below.

As used herein, a "deep learning task" refers to a processing task related to a high-performance computing, machine learning and artificial intelligent algorithm, which is also referred to as a "deep learning application." The characteristics of the deep learning task lie in a demand on a powerful processing capability for massive data, particularly on a parallel processing capability. In addition, some deep learning tasks are run on a traffic flow platform. Some examples of the deep learning tasks may include training a deep learning model, using a deep learning model, and the like. The deep learning model herein can be any type of learning model or neural network.

Typically, processing of the deep learning tasks imposes large demands on specific computing capability (generally represented by Floating Point Operations Per Second (FLOPS)) and storage capacity for hours, days or even weeks. Moreover, depending on requirements of different aspects of the tasks including, for example, objects, complexity, and accuracy, the resources required by different deep learning tasks may vary. Thus, it is possible to ensure completion of the deep learning tasks by scheduling processing resources required by these tasks before performing them.

In a conventional solution, typically it is the user who directly specifies resources to the deep learning tasks. FIG. 1 illustrates a schematic diagram of a system 100 based on such a solution. In the system 100, a user terminal 110 seeks to use resources in a resource pool 130 to process a deep learning task 120. The resource pool 130 can be a set of resources available to the user terminal 110, for example, a data center or the like. The resources in the resource pool 130 are illustrated in FIG. 1 as being deployed in the cloud. In order to process the deep learning task 120, the user terminal 110 sends to the resource pool 130 a message 114 to indicate specific resources required for processing the deep learning task 120 such as, 10 CPU kernels, 16 GB (gigabytes) storage, 5 GPUs, and the like. These specific resources are indicated by a user 102 of the user terminal 110 via a user input 112. The user terminal 110 may also send a file of the deep learning task 120 to the resource pool 130. The resource pool 130 allocates the resources specified in the message 114 for processing the deep learning task 120, and returns a processing result 132 of the deep learning task 120 to the user terminal 110.

Specifying the processing resources of the deep learning task directly by the user (for example, the manner as shown in FIG. 1) is based on the assumption that the user clearly knows the resource demand of the task, which depends largely on the experience and knowledge of the user. Although the task can also be completed with resources that are specified in an unreasonable manner (for example, fewer resources than needed are specified), it will result in a long waiting time. If too many resources are specified by the user for processing a particular deep learning task, this will result in resource waste and reduce the overall system efficiency. Further, since running of a deep learning task usually takes a long time, a user is required to estimate by himself/herself which resources or how many resources should be specified for completing the deep learning task if he/she has a specific requirement or expectation on the task completing time, which poses a great challenge to the user.

In accordance with embodiments of the present disclosure, there is provided a solution for resource scheduling. In the solution, one or more resources are scheduled based on a processing requirement for a deep learning task, which is specified by a user directly and related to at least a completion time of the deep learning task. In this manner, the resources can be scheduled reasonably and flexibly to satisfy the user's processing requirement for a particular deep learning task without requiring the user to manually specify the specific requirement on the resources.

Figure 2:
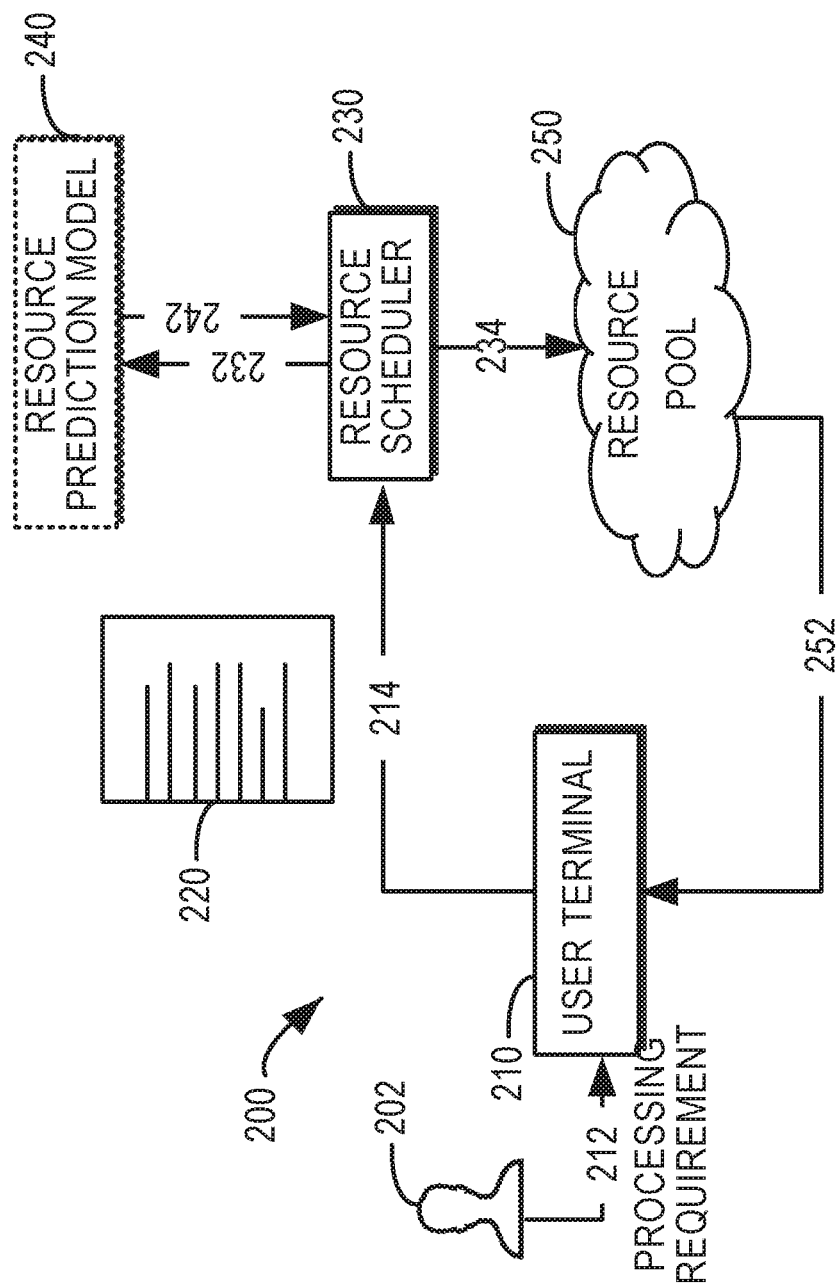
FIG. 2 illustrates a schematic diagram of a system for resource scheduling in accordance with embodiments of the present disclosure.

FIG. 2 illustrates a schematic diagram of a system 200 for resource scheduling in accordance with embodiments of the present disclosure. The system 200 involves a user terminal 210 and a resource pool 250. The system 200 further involves a resource scheduler 230 configured to schedule resource(s) from the resource pool 250 for the user terminal 210. If a user 202 of the user terminal 210 expects to process a deep learning task 220, the user terminal 210 may send a scheduling request 214 to the resource scheduler 230.

In accordance with embodiments of the present disclosure, the user terminal 210 indicates a processing requirement for the deep learning task 220 to the resource scheduler 230. The user terminal 210 may indicate the processing requirement specified by the user 202 in the scheduling request 214. Herein, the processing requirement may be also referred to as a Service-Level Agreement (SLA). The processing requirement is specified by the user 202 of the user terminal 210 and at least includes a requirement related to a completion time of the deep learning task 220. The user 202 may input this requirement via a user input 212 to the user terminal 210. For example, the user 202 may directly specify, through the user input 212, that processing of the deep learning task 220 is expected to be completed within 30 minutes or one hour, for example.

In some embodiments, the processing requirement for the deep learning task 220 may also include a requirement related to a processing cost of the deep learning task 220. The requirement for the processing cost may include an energy consuming cost of resources that are to be determined for processing the deep learning task 220. For example, as compared with two devices with a medium capability of processing, a single device with a greater capability of processing consumes less energy. Alternatively, or in addition, the requirement for the processing cost may include an expenditure cost of resources that are to be determined for processing the deep learning task 220. Such a requirement is used for a case in which the user is required to pay for the resource usage. Given the completion time of the deep learning task 220 can be ensured, the processing cost of the determined resources (for example, the energy consuming cost and/or the expenditure cost) is expected to be relatively low (for example, below an acceptable threshold or have a minimum value).

The resource scheduler 230 obtains the processing requirement for the deep learning task 220, for example, from the scheduling request 214. In response to the scheduling request 214, the resource scheduler 230 determines the resource(s) required by the deep learning task 220 based on the processing requirement, such that the processing of the deep learning task 220 on the basis of the determined resource(s) can satisfy the processing requirement. In particular, it can be at least ensured that the processing of the deep learning task 220 based on the determined resources can be completed within the required completion time. In addition, the processing cost (for example, the energy consuming cost and/or the expenditure cost) of the determined resources may not exceed the requirement related to the processing cost.

In some embodiments, the resource scheduler 230 may use a resource prediction model 240 to determine the resource(s) required by the deep learning task 220. The resource prediction model 240 may be trained to a model for implementing resource prediction. The resource prediction model 240 may be implemented as, for example, a learning model and may output a resource(s) based on a specific input (including the processing requirement for the deep learning task 220) such that the output resource(s) satisfies the input processing requirement. The resource scheduler 230 may send to the resource prediction model 240 a prediction request 232 that includes the processing requirement for the deep learning task 220.

In order to perform resource prediction for the deep learning task 220, the resource prediction model 240 further requires information related to the deep learning task 220. The demand of the deep learning task 220 on the resources typically relates to the specific design of the deep learning task 220. The information regarding what has an influence on the resource amount required by the deep learning task 220 may include representation data and one or more processing parameters of the deep learning task 220. The representation data of the deep learning task 220 refers to specific design data or code of the deep learning task 220. For example, if the deep learning task 220 includes training or utilization of a neural network, the representation data of the deep learning task 220 includes data describing the neural network structure, training data for the training, running code of the neural network, and the like. The above data is generally compiled by a technician or designer in the form of code and stored as a file.

In addition to the representation data of the deep learning task 220, the processing parameter(s) of the deep learning task 220 is typically configured by the designer/developer of the task. The parameters have an impact on the complexity of the task, and thus affect the demand of the resources for the task. For example, if the deep learning task 220 includes training a neural network, the processing parameters may include epochs of passing all training samples through the neural network, the number of iterations per epoch, the number of training samples used per iteration, a gradient optimization algorithm, and the like. For example, for a given deep learning task, if 1000 training samples are used for training and the number of samples per iteration is specified as 500, two iterations are required to be performed per epoch. The designer of the deep learning task may also specify the number of epochs that the training samples pass the neural network.

The representation data and the processing parameter(s) of the deep learning task 220 will affect the requirements on the processing and storage resources required for processing the deep learning task 220. The representation data and the processing parameter(s) of the deep learning task 220 may be sent by the user terminal 210 to the resource scheduler 230 within or together with the scheduling request 214. In some embodiments, the user terminal 210 may directly send the representation data (for example, a file including specified code) of the deep learning task 220 to the resource scheduler 230. In some embodiments, the user terminal 210 may indicate the representation data to the resource scheduler 230 of the deep learning task 220 (for example, a location of a code file, a location and an amount of the training data, a code executing command, and the like) so as to reduce the data transfer overhead. The resource scheduler 230 may feed the information back to the resource prediction model 240, and the resource prediction model 240 may obtain corresponding information if required.

Based on the processing requirement for the deep learning task 220 and possibly further based on the representation data and the processing parameter of the deep learning task 220, the resource prediction model 240 may determine the resource(s) required by the deep learning task 220. The determined resources can enable the processing of the deep learning task 220 to satisfy the processing requirement, including the requirement for the completion time and possibly the requirements for the processing costs. For example, if the completion time as required is a short one, the resource prediction model 240 will allocate more processing devices and storage space or a more powerful processing device and a larger storage space for processing the deep learning task 220. Moreover, the amount and/or type of the determined resource may also satisfy the requirements related to the processing costs.

The resource prediction model 240 may return a resource indication 242 to the resource scheduler 230 to indicate the determined resource(s). The resource indication 242 may indicate, for example, one or more types of dedicated processing resources (dedicated processing devices such as GPUs, FPGAs, and the like), general processing resources (for example, CPU devices) and storage resources (for example, memories and persistent storage devices), for processing the deep learning task 220. In some implementations, the resource indication 242 may indicate the amount and/or the type of the resources that satisfy the processing requirement for the deep learning task 220 (for example, the processing requirement related to the completion time). For example, it may only indicate the number of GPUs of a particular type, the number of CPU kernels of a particular type, and a size of memory. In some embodiments, if the requirement of the deep learning task 220 for the general processing resources (for example, CPUs) is not that great, there is no need for the resource prediction model 240 to determine the general processing resource required by the deep learning task 220.

In some embodiments, the resources predicted by the resource prediction model 240 include resources in the resource pool 250. In this case, the resource prediction model 240 may obtain information of the current available resources (including information related to the dedicated and general processing resources as well as storage resources). Such information may include an amount of available resources, and/or may include specific available resources.

The resource scheduler 230 obtains the resource indication 242 to determine the resources required by the deep learning task 220. In some embodiments, the resource scheduler 230 manages resource scheduling of the resource pool 250 and thus may allocate the determined resources from the resource pool 250 for processing the deep learning task 220. The resource scheduler 230 may allocate 234 the current available resources in the resource pool 250 for processing the deep learning task 220. Subsequent to processing with the allocated resources, a processing result 252 of the deep learning task 220 may be provided to the user terminal 210, and presented or notified by the user terminal 210 to the user 202.

In some embodiments, based on the processing requirement from the user, the resource prediction model 240 may determine a plurality of sets of candidate resources that satisfy the processing requirement. Each set of candidate resources may indicate certain resources required for the deep learning task 220, for example, certain GPU(s), CPU(s) and/or an amount of storage resources. The resource prediction model 240 may provide these candidate resources to the resource scheduler 230, and the resource scheduler 230 indicates these candidate resources to the user 202 for user selection. The user 202 may select a certain set of candidate resources according to needs, and this user selection may be transmitted by the user terminal 210 to the resource scheduler 230. In response to the user selection, the resource scheduler 230 selects the resources required by the deep learning task 220 from the plurality of sets of candidate resources.

In some embodiments, an expected completion time of the deep learning task may also be determined based on the determined resources. In order to satisfy the processing requirement, the expected completion time is less than or equal to the completion time specified in the processing requirement. The expected completion time may be determined by the resource prediction model 240 or the resource scheduler 230 based on the resources returned by the resource prediction model 240. The resource scheduler 230 may provide the expected completion time to the user terminal 210, thereby allowing the user terminal 210 to provide the same to the user 202 (for example, to present the same to the user 202 via a display). As such, the user 202 may know intuitively the expected completion time of the deep learning task 220 in the circumstance of the current resource scheduling.

In the embodiments having a requirement related to the processing cost, an expected processing cost of the deep learning task, such as an expected energy consuming cost and/or expected expenditure cost, may also be determined by the resource prediction model 240 or the resource scheduler 230. This expected processing cost may be provided to the user terminal 210 to present to the user 202.

In the embodiments of providing a plurality of sets of candidate resources to the user 202, a predicated completion time and an expected processing cost related to each set of candidate resources can be determined. The user 202 may select, based on the presented expected completion time and expected processing cost, specific candidate resources for processing the deep learning task 220.

The resource pool 250 may be a set of resources available to the user terminal 210, including dedicated processing resources, general processing resources, and storage resources. In some embodiments, the resource pool 250 may be deployed as a data center. In an example of FIG. 2, the resource pool 250 is shown to be deployed in the cloud, and accordingly physical devices providing respective resources are deployed in a distributed manner. In other examples, the resource pool 250 may be deployed or supplied in other manners, for example, in a centralized manner.

Embodiments of scheduling resources for the deep learning task have been described above with reference to the example of FIG. 2. In some embodiments, the user terminal 210 may be any type of a mobile terminal, a fixed terminal, or a portable terminal, including a mobile phone, a site, a unit, a device, a multimedia computer, a multimedia tablet, an Internet node, a communicator, a desktop computer, a laptop computer, a notebook computer, a netbook computer, a tablet computer, or the like. In some embodiments, the resource scheduler 230 may be implemented as any manager and/or controller, so as to implement resource scheduling for the user terminal 210. The resource scheduler 230 may also be implemented by a computer device of any type. Although the resource scheduler 230 is described above to use a pre-trained resource prediction model 240 to determine the resources required by the deep learning task 200, in other embodiments, the resource scheduler 230 may also determine the required resources in any other manner.

Figure 3:
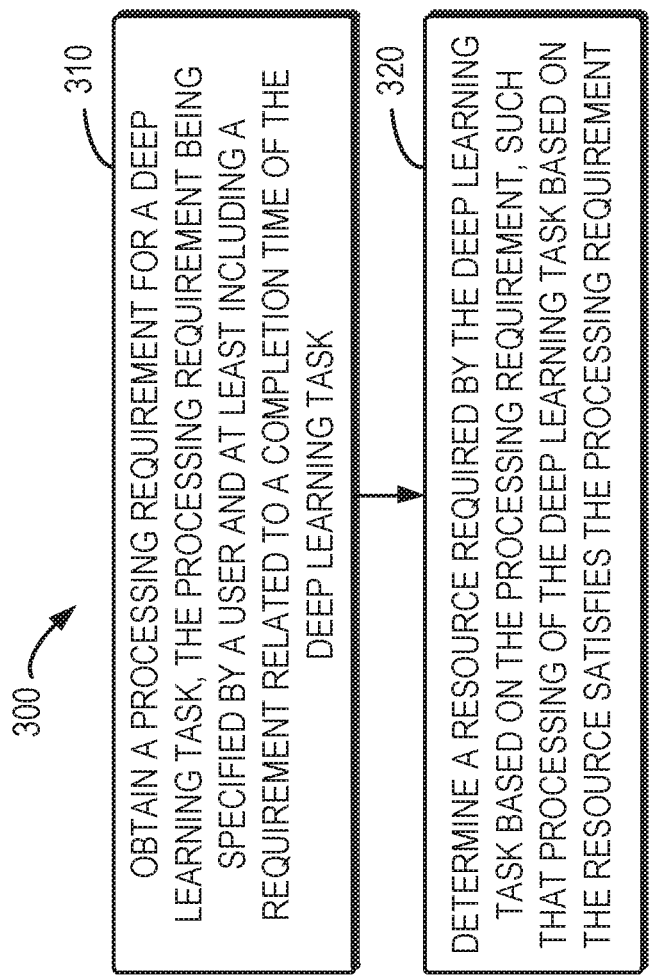
FIG. 3 illustrates a flowchart of a process of resource scheduling in accordance with embodiments of the present disclosure.

FIG. 3 illustrates a flowchart of a process 300 of resource scheduling in accordance with embodiments of the present disclosure. The process 300 can be implemented by the resource scheduler 230 in the system as shown in FIG. 2. For purpose of discussion, the description is provided with reference to FIG. 2. It is to be appreciated that the process can include additional steps not shown and/or some shown steps may be omitted, and the scope of the present disclosure is not limited in this regard.

At 310, the resource scheduler 230 obtains a processing requirement for a deep learning task, the processing requirement being specified by a user and at least including a requirement related to a completion time of the deep learning task. At 320, the resource scheduler 230 determines a resource required by the deep learning task based on the processing requirement, such that processing of the deep learning task based on the resource satisfies the processing requirement.

In some embodiments, determining the resource required by the deep learning task may further include: obtaining representation data and a processing parameter of the deep learning task and determining the resource based on the representation data and the processing parameter.

In some embodiments, the processing requirement may also include a requirement related to a processing cost of the deep learning task.

In some embodiments, determining the resource required by the deep learning task may include determining at least one of: a dedicated processing resource, a general processing resource and a storage resource.

In some embodiments, the processing 300 may also include: determining an expected completion time of the deep learning task based on the resource and providing the expected completion time for the user.

In some embodiments, determining the resource required by the deep learning task comprises: determining a plurality of sets of candidate resources that satisfy the processing requirement and in response to a user selection, selecting from the plurality of sets of candidate resources, the resource required by the deep learning task.

In some embodiments, the process 300 may also include allocating the determined resource from the resource pool for processing the deep learning task.

Figure 4:
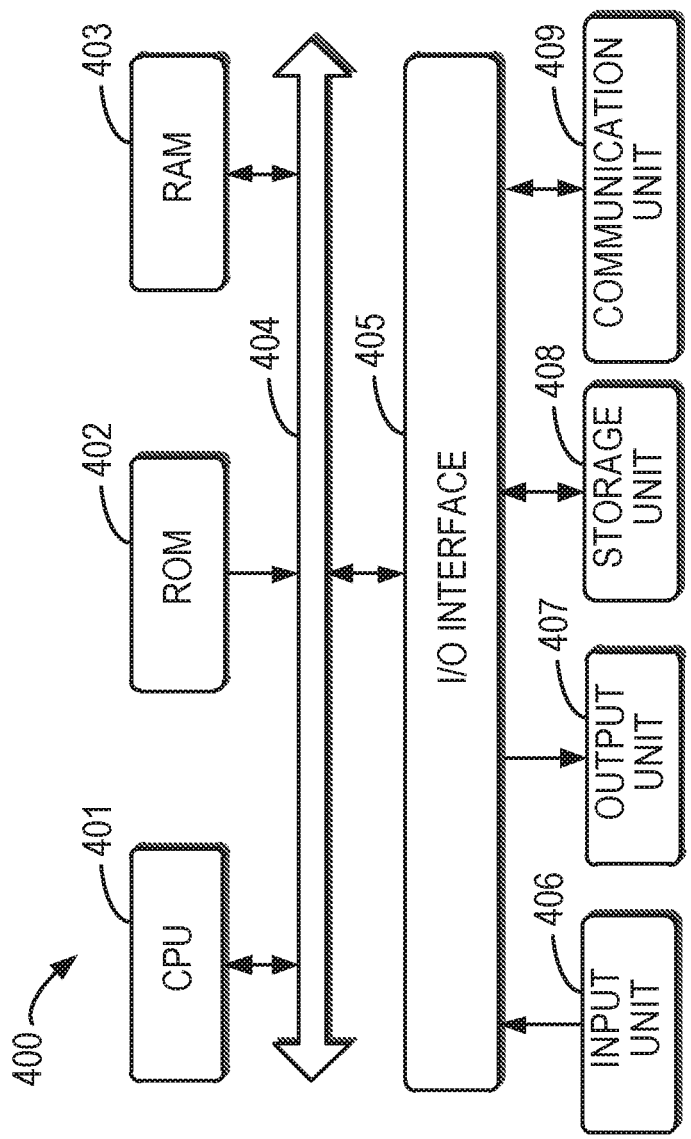
FIG. 4 illustrates a block diagram of an example device in accordance with embodiments of the present disclosure.

FIG. 4 illustrates a schematic block diagram of an example device 400 for implementing embodiments of the present disclosure. The device 400 can be provided for implementing the process 300 of FIG. 3. The device 400 can be implemented as the resource scheduler 230 or the user terminal 210 in the system 200 of FIG. 2. As shown, the device 400 includes a central processing unit (CPU) 401, which can execute various suitable actions and processing based on the computer program instructions stored in the read-only memory (ROM) 402 or computer program instructions loaded in the random-access memory (RAM) 403 from a storage unit 408. The RAM 403 can also store all kinds of programs and data required by the operations of the device 400. CPU 401, ROM 402 and RAM 403 are connected to each other via a bus 404. The input/output (I/O) interface 405 is also connected to the bus 404.

A plurality of components in the device 400 are connected to the I/O interface 405, including: an input unit 406, such as keyboard, mouse and the like; an output unit 407, e.g., various kinds of display and loudspeakers etc.; a storage unit 408, such as disk and optical disk etc.; and a communication unit 409, such as network card, modem, wireless transceiver and the like. The communication unit 409 allows the device 400 to exchange information/data with other devices via the computer network, such as Internet, and/or various telecommunication networks.

The above-described method and process, such as the process 300, can also be performed by the processing unit 401. In some embodiments, the process 300 can be implemented as a computer software program or a computer program product tangibly included in the machine-readable medium, e.g., storage unit 408. In some embodiments, the computer program can be partially or fully loaded and/or mounted to the device 400 via ROM 402 and/or communication unit 409. When the computer program is loaded to RAM 403 and executed by the CPU 401, one or more actions of the above described process 300 can be implemented. Alternatively, CPU 401 can be configured via any other suitable manners (e.g., by refers to of firmware) to execute the process 300 in other embodiments.

Those skilled in the art would understand that various steps of the method of the disclosure above may be implemented via a general-purpose computing device, which may be integrated on a single computing device or distributed over a network composed of a plurality of computing devices. Optionally, they may be implemented using program code executable by the computing device, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the apparatus have been mentioned in detailed description above, such partition is only example but not limitation. Actually, according to the embodiments of the present disclosure, features and functions of two or more apparatuses described above may be instantiated in one apparatus. In turn, features and functions of one apparatus described above may be further partitioned to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

What is claimed is:

1. A method of resource scheduling, comprising steps of:
    obtaining a processing requirement for a deep learning task, the processing requirement being specified by a user and at least comprising a requirement related to a completion time of the deep learning task; and
    determining, based on the processing requirement, a resource required by the deep learning task such that processing of the deep learning task based on the resource satisfies the processing requirement;
    wherein determining the resource required by the deep learning task comprises:
        determining a plurality of sets of candidate resources that satisfy the processing requirement;
        determining at least a predicated completion time associated with each set of candidate resources;
        presenting the sets of candidate resources and respective predicated completion times to a user interface;
        receiving, from the user interface, a user selection of a given set of the sets of candidate resources; and
        in response to the user selection of the given set, selecting the resource required by the deep learning task; and
    wherein one or more of the predicated completion times associated with respective sets of candidate resources is less than or equal to the completion time specified in the processing requirement; and
    wherein the steps are performed by a processor and a memory coupled to the processor and having instructions stored thereon which are executed by the processor.

2. The method of claim 1, wherein determining the resource required by the deep learning task further comprises:
    obtaining representation data and a processing parameter of the deep learning task; and
    determining the resource based on the representation data and the processing parameter.

3. The method of claim 1, wherein the processing requirement further comprise a requirement related to a processing cost of the deep learning task.

4. The method of claim 1, wherein determining the resource required by the deep learning task comprises determining at least one of:
    a dedicated processing resource;
    a general processing resource; and
    a storage resource.

5. The method of claim 1, further comprising:
    allocating the determined resource from a resource pool for processing the deep learning task.

6. An apparatus for resource scheduling, comprising:
    a processor; and
    a memory coupled to the processor and having instructions stored thereon which, when executed by the processor, cause the apparatus to perform steps comprising:
        obtaining a processing requirement for a deep learning task, the processing requirement being specified by a user and at least comprising a requirement related to a completion time of the deep learning task; and
        determining, based on the processing requirement, a resource required by the deep learning task such that processing of the deep learning task based on the resource satisfies the processing requirement;
    wherein determining the resource required by the deep learning task comprises:
        determining a plurality of sets of candidate resources that satisfy the processing requirement;
        determining at least a predicated completion time associated with each set of candidate resources;
        presenting the sets of candidate resources and respective predicated completion times to a user interface;
        receiving, from the user interface, a user selection of a given set of the sets of candidate resources; and
        in response to the user selection of the given set, selecting the resource required by the deep learning task; and
    wherein one or more of the predicated completion times associated with respective sets of candidate resources is less than or equal to the completion time specified in the processing requirement.

7. The apparatus of claim 6, wherein determining the resource required by the deep learning task further comprises:
    obtaining representation data and a processing parameter of the deep learning task; and
    determining the resource based on the representation data and the processing parameter.

8. The apparatus of claim 6, wherein the processing requirement further comprises a requirement related to a processing cost of the deep learning task.

9. The apparatus of claim 6, wherein determining the resource required by the deep learning task comprises determining at least one of:
    a dedicated processing resource;
    a general processing resource; and
    a storage resource.

10. The apparatus of claim 6, wherein the steps further comprise:
    allocating the determined resource from a resource pool, for processing the deep learning task.

11. A computer program product being tangibly stored on a non-transitory computer-readable medium and comprising machine-executable instructions which, when executed, cause a machine to perform steps comprising:
  obtaining a processing requirement for a deep learning task, the processing requirement being specified by a user and at least comprising a requirement related to a completion time of the deep learning task; and
  determining, based on the processing requirement, a resource required by the deep learning task such that processing of the deep learning task based on the resource satisfies the processing requirement;
  wherein determining the resource required by the deep learning task comprises:
    determining a plurality of sets of candidate resources that satisfy the processing requirement;
    determining at least a predicated completion time associated with each set of candidate resources;
    presenting the sets of candidate resources and respective predicated completion times to a user interface;
    receiving, from the user interface, a user selection of a given set of the sets of candidate resources; and
    in response to the user selection of the given set, selecting the resource required by the deep learning task; and
  wherein one or more of the predicated completion times associated with respective sets of candidate resources is less than or equal to the completion time specified in the processing requirement.

12. The computer program product of claim 11, wherein determining the resource required by the deep learning task further comprises:
  obtaining representation data and a processing parameter of the deep learning task; and
  determining the resource based on the representation data and the processing parameter.

13. The computer program product of claim 11, wherein the processing requirement further comprise a requirement related to a processing cost of the deep learning task.

14. The computer program product of claim 11, wherein determining the resource required by the deep learning task comprises determining at least one of:
  a dedicated processing resource;
  a general processing resource; and
  a storage resource.

15. The method of claim 1, wherein the user selection is performed via a user input interface.

16. The apparatus of claim 6, wherein the user selection is performed via a user input interface.

17. The computer program product of claim 11, wherein the steps further comprise:
  allocating the determined resource from a resource pool, for processing the deep learning task.

18. The method of claim 3, further comprising presenting the processing cost to the user interface.

19. The apparatus of claim 8, further comprising presenting the processing cost to the user interface.

20. The computer program product of claim 13, further comprising presenting the processing cost to the user interface.

* * * * *